(12) United States Patent
Covington et al.

(10) Patent No.: US 11,975,828 B2
(45) Date of Patent: May 7, 2024

(54) SYSTEM AND METHOD FOR CALIBRATING TORQUE MEASUREMENTS

(71) Applicant: Bell Textron Inc., Fort Worth, TX (US)

(72) Inventors: Charles Eric Covington, Colleyville, TX (US); Brian E. Tucker, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 391 days.

(21) Appl. No.: 17/363,051

(22) Filed: Jun. 30, 2021

(65) Prior Publication Data
US 2023/0002040 A1 Jan. 5, 2023

(51) Int. Cl.
| | |
|---|---|
| *B64C 27/57* | (2006.01) |
| *B64D 43/00* | (2006.01) |
| *B64D 45/00* | (2006.01) |
| *G01L 3/10* | (2006.01) |

(52) U.S. Cl.
CPC .............. *B64C 27/57* (2013.01); *B64D 43/00* (2013.01); *G01L 3/109* (2013.01); *B64D 2045/0085* (2013.01)

(58) Field of Classification Search
CPC . G01L 25/00; G01L 3/101; G01L 3/12; G01L 3/104; G09B 9/18; G09B 9/28; B60Q 1/0683; G06F 30/20; G05D 1/102; B64D 45/00
See application file for complete search history.

(56) References Cited

U.S. PATENT DOCUMENTS

| | | | | |
|---|---|---|---|---|
| 3,026,629 A | * | 3/1962 | Peck ......................... | G09B 9/28 |
| | | | | 434/45 |
| RE25,325 E | * | 1/1963 | Goodwin .................. | G09B 9/18 |
| | | | | 434/54 |

(Continued)

FOREIGN PATENT DOCUMENTS

| | | | |
|---|---|---|---|
| EP | 3 734 575 A1 | 11/2020 | |
| JP | 2004009846 A * | 1/2004 | ............. B64D 45/00 |

OTHER PUBLICATIONS

European Patent Office, "Communication pursuant to Article 94(3) EPC," EPO Application No. 22170362.2, dated Oct. 17, 2022, 11 pages, publisher Rijswijk, Netherlands.

(Continued)

*Primary Examiner* — Yuri Kan
(74) *Attorney, Agent, or Firm* — Fogarty LLP (57) ABSTRACT

A torque measurement system determines torque on a shaft by monitoring angular deflection of the shaft under load using phase shift measurements. Calibration of the system uses a defined offset that is determined using a reference operating condition. The offset calibration value is determined for a rotorcraft using the following steps: defining a reference operational condition in which the shaft is rotating, estimating the torque at the reference condition based on aerodynamic knowledge of the rotors coupled to the shaft, operating the shaft at the reference operational condition, capturing sensor data to determine the phase difference at the operational condition, and associating the phase difference and an estimated torque as a calibration value to enable calculation of torque in the torque measurement system.

19 Claims, 9 Drawing Sheets

(56) References Cited

U.S. PATENT DOCUMENTS

| | | | | |
|---|---|---|---|---|
| 5,779,343 | A * | 7/1998 | Denley | B60Q 1/0683 |
| | | | | 362/273 |
| 2010/0030495 | A1* | 2/2010 | Jackson | G01L 3/104 |
| | | | | 702/41 |
| 2011/0022250 | A1* | 1/2011 | Hamburg | G05D 1/102 |
| | | | | 701/11 |
| 2013/0060538 | A1* | 3/2013 | Perez Garraleta | G06F 30/20 |
| | | | | 703/2 |
| 2021/0172814 | A1* | 6/2021 | Wenske | G01L 3/12 |
| 2021/0247259 | A1* | 8/2021 | Altieri | G01L 3/101 |

OTHER PUBLICATIONS

European Patent Office, "European Search Report," EP Application No. 22170362.2, dated Oct. 5, 2022, 4 pages, published The Hague, Netherlands.

\* cited by examiner

SYSTEM AND METHOD FOR CALIBRATING TORQUE MEASUREMENTS

BACKGROUND

Torque in a rotorcraft, such as torque in a helicopter drive shaft or mast, can be measured by observing the rotational phase shift, or torsion, across the length of the mast. The rotational phase shift between opposite ends of the mast is caused by twisting of the helicopter mast. Measurements of the phase shift during operation determine how much twist is imparted to the mast, and this twist can be related to torsional load on the mast. Traditionally, to calibrate the phase shift measurements, such measurement must be obtained while the shaft is rotating. This requires many key components of the mast to be removed to create a zero-load condition (i.e., no torque). The removal of such components adds maintenance cost and time to create the zero torque conditions. Additionally, in the case of measuring tail rotor torque, turning a main rotor without having a tail rotor available may lead to a safety hazard since the tail rotor counteracts torque that may be generated from the main rotor. Without a tail rotor, the aircraft may start to rotate in the opposite direction of the main rotor rotation.

SUMMARY

Embodiments are directed to systems and methods for calibrating a torque measurement system. A reference operating condition is used to conduct a calibration without requiring zero torque. A torque model that accounts for operational conditions and atmospheric conditions provides a precise estimation of the torque at this condition. This saves both cost and time and improves safety by avoiding the need to remove rotors to achieve a zero-torque condition.

A torque measurement system determines torque on a shaft by monitoring angular deflection of the shaft under load using phase shift measurements. Calibration of the system uses a defined offset that is determined using a reference operating condition. The offset calibration value is determined for a rotorcraft using the following steps: defining a reference operational condition in which the shaft is rotating, estimating the torque at the reference condition based on aerodynamic knowledge of the rotors coupled to the shaft, operating the shaft at the reference operational condition, capturing sensor data to determine the phase difference at the operational condition, and associating the phase difference and an estimated torque as a calibration value to enable calculation of torque in the torque measurement system.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
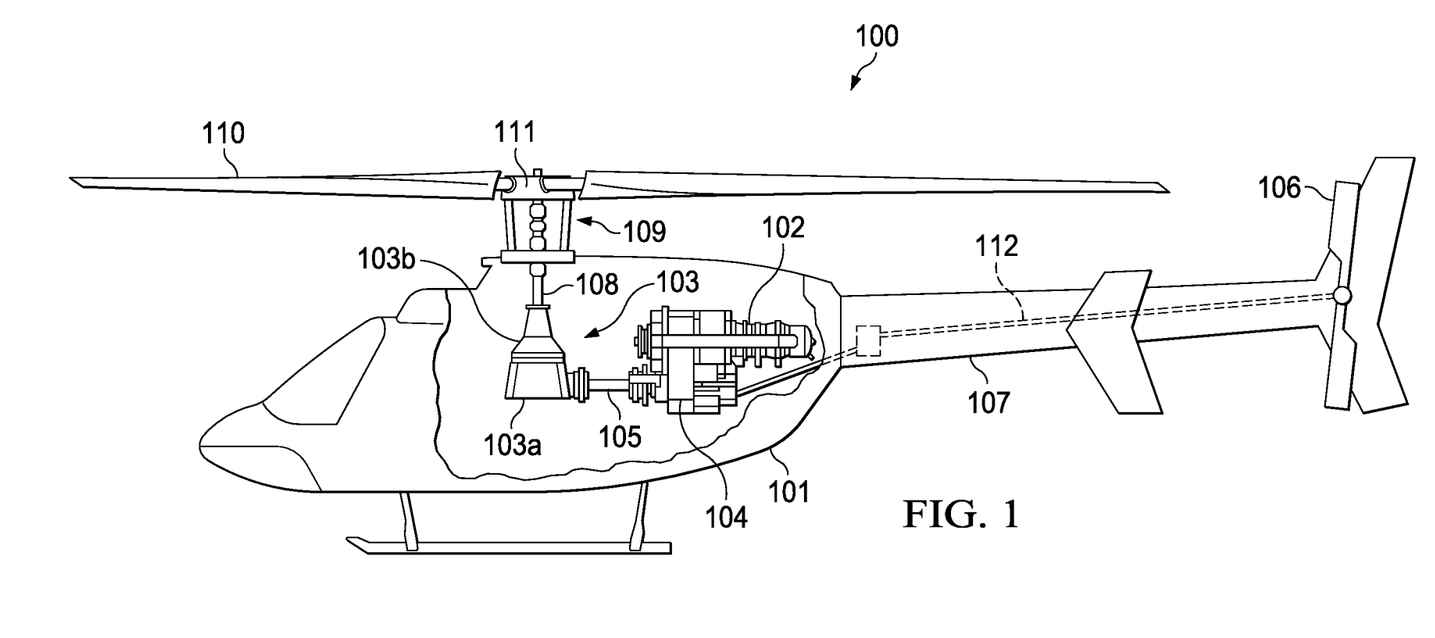
FIG. 1 depicts a rotorcraft that may incorporate calibrating torque measurements as disclosed herein.

FIG. 1. illustrates a helicopter 100 comprising a fuselage 101, an engine 102, a main rotor gearbox (MRGB) 103 that is mechanically coupled to the engine 102 through a reduction gearbox 104. Reduction gearbox 104 has a drive shaft 105 powering MRGB 103. A tail rotor 106 functions as an anti-torque system mounted on tail member 107. Reduction gearbox 104 has attachment points for the engine accessories, such a starter-generator, a fuel pump, tachometers, etc. A mast 108 mechanically couples MRGB 103 to rotor system 109. The rotor system 109 comprises rotor blades 110 that are coupled to mast 108 via a hub 111. Engine 102 supplies torque to main rotor mast 101 via MRGB 103 to rotate main rotor blades 110. Engine 102 also supplies torque to a tail rotor drive shaft 112 to rotate tail rotor 106.

Rotor blades 110 provide lift to enable flight for helicopter 100. The rotor blades 110 are controlled by multiple controllers within fuselage 101. The pitch of each rotor blade 109 can be manipulated to selectively control direction, thrust, and lift of the helicopter 100. For example, during flight a pilot can manipulate a cyclic controller to change the pitch angle of rotor blades 110 and/or manipulate pedals to change the pitch of the blades on tail rotor 106. The flight controls provide control over the vertical, horizontal, and yaw movements of the helicopter 100.

The main power and accessory drive gear trains are enclosed in the reduction gearbox 104. The reduction gearbox 104 is connected to engine 102 and engine components, including the compressor, the turbine, and engine accessories, are attached to the gearbox 104 case. MRGB 103 functions to convert high speed rotation of output drive shaft 105 from engine 102 into lower speed rotation of main rotor mast 108. MRGB 103 may include a plurality of gears and bearings within an upper case 103a and a lower case 103b. A torque meter, such as phase shift monitoring system, may be used to monitor the torque applied to drive shaft 105, mast 108, tail rotor drive shaft 112, or the tail rotor mast. It should be appreciated that the embodiments disclosed in the present application may be used on aircraft other than helicopters, such as airplanes, tilt rotors, unmanned aircraft, to name a few examples. Further, the embodiments of the present application may be used on non-aircraft vehicles and implementations.

Figure 2:
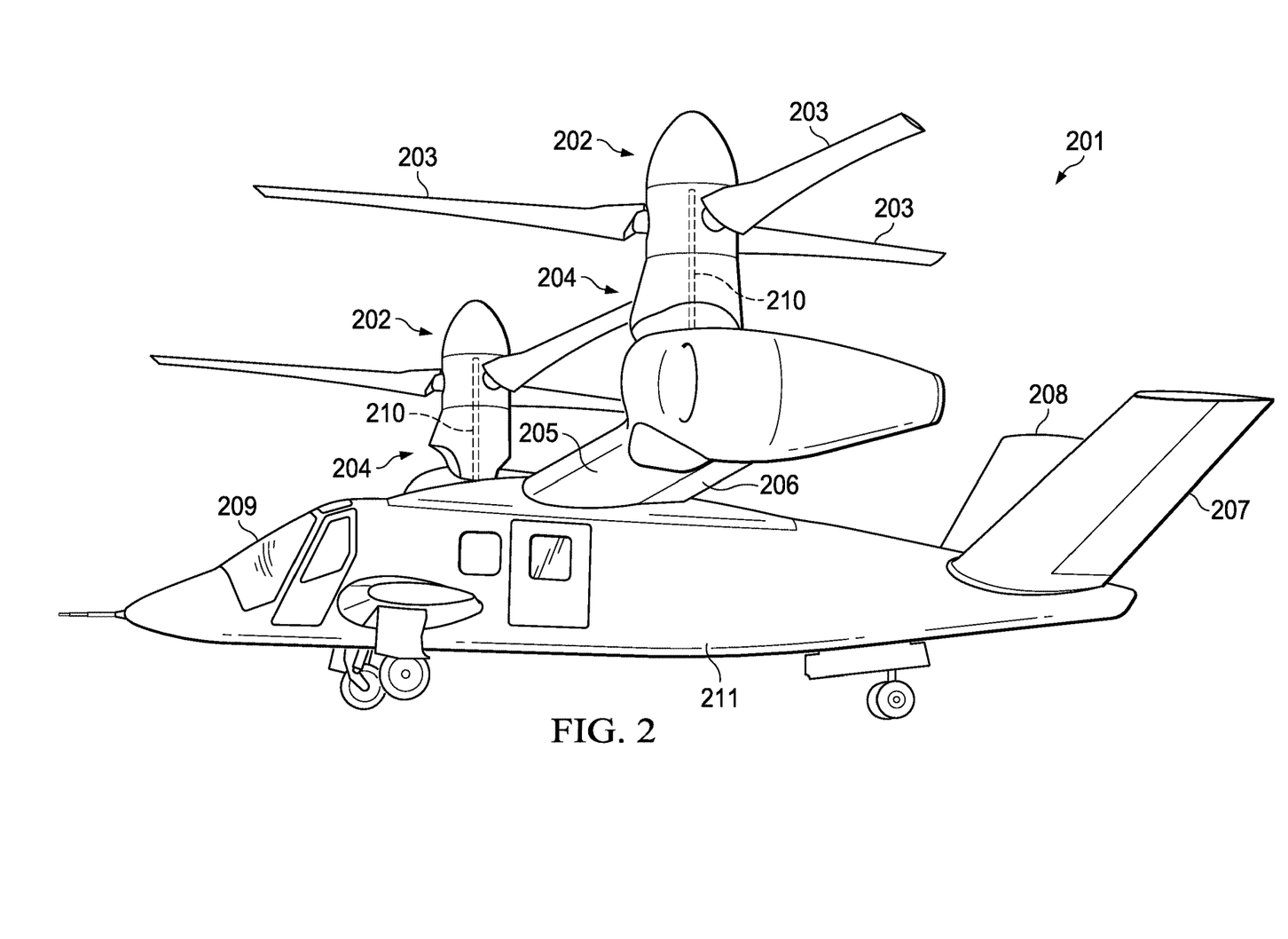
FIG. 2 depicts an example tiltrotor aircraft that may incorporate calibrating torque measurements as disclosed herein.

FIG. 2 is an oblique view of an example tiltrotor aircraft 201. Tiltrotor aircraft 201 has two proprotors 202. Each proprotor 202 has plurality of rotor blades 203 that are driven by an engine 204. Although FIG. 2 shows tiltrotor aircraft 201 in a helicopter mode wherein proprotors 202 are oriented substantially vertical to provide a lifting thrust. It will be understood that in other embodiments, tiltrotor aircraft 201 may operate in an airplane mode wherein proprotors 202 are oriented substantially horizontal to provide a forward thrust. Proprotors 202 may also move between the vertical and horizontal positions during flight as tiltrotor aircraft 201 transitions between a helicopter mode and an airplane mode.

Proprotors 202 and engines 204 are mounted on wings 205, which are attached to a fuselage 211. Wings 205 may provide lift to tiltrotor aircraft 201 in certain flight modes (e.g., during forward flight airplane mode) in addition to supporting rotatable nacelles for engines 204 and proprotor systems 202. Control surfaces 206 on wings 205 and/or control surfaces 207 on a tail section 208 may be used to adjust the attitude of tiltrotor aircraft 201 around the pitch, roll, and yaw axes while in airplane mode. Control surfaces 206 and 207 may be, for example, ailerons, flaps, slats, spoilers, elevators, or rudders that are controlled by cyclic controllers, pedals, or other flight controls within cockpit 209 of fuselage 211.

In tiltrotor aircraft 201, each proprotor 202 is coupled to an engine 204 by a mast or drive shaft 210 that transmits torque to turn rotor blades 203. Like rotorcraft 100, in tiltrotor aircraft 201 a torque meter may be used to monitor the torque applied to drive shafts 210. In existing tiltrotor torque transmissions, interconnect drive shafts send torque from one proprotor to another in case of an engine failure. Torque on these interconnect drive shafts may also be monitored by a torque meter.

Figure 3A:
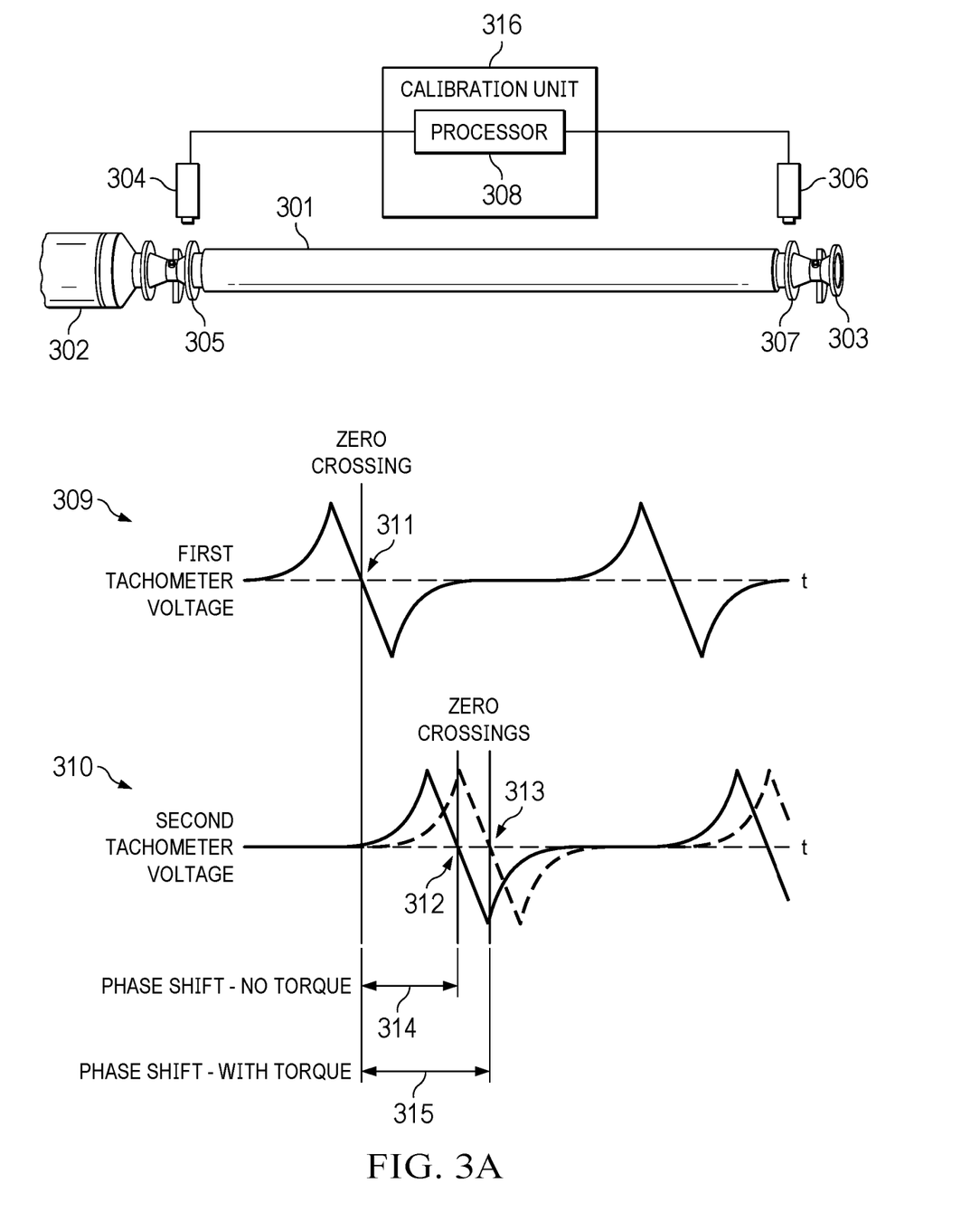
FIGS. 3A-C illustrate systems for measuring torque according to example embodiment.

FIG. 3A illustrates a system for measuring torque according to an example embodiment. A drive shaft 301, such as a helicopter main rotor or tail rotor driveshaft or mast may couple an output 302 to input 303. In some embodiments, a drive shaft 301 couples a output 302 of a gearbox to input 303 of a rotor system. In other embodiments, for example, a drive shaft 301 may couple an output 302 of an engine to input 303 of a gearbox. Output 302 rotates and applies a load to drive shaft 301, which rotates in turn and transfers the load to input 303. As the load on drive shaft 301 increases, the shaft may twist as the rotation of the drive shaft end at input 303 begins to lag the rotation of the end at output 302. The rotation of each end of drive shaft 301 can be monitored using a tachometer, for example. A first tachometer 304 determines the change in rotational position of a first target 305 on a first end of drive shaft 301, and a second tachometer 306 determines the change in rotational position of a second target 307 on a second end of drive shaft 301. Signals from tachometers 304, 306 are provided to a processor 308 of calibration unit 316 for analysis.

A phase-based measurement system is typically used to determine the change in the position of targets 305 and 307 passing tachometers 304 and 306 using a proximity-type sensor, such as a monopole or Variable Reluctance (VR) sensor. Measurements from each end are used to determine how much twist is imparted to the drive shaft 301, and this twist can be related to torsional load. A processor 308 can receive signals from sensors 304, 306, such as a first tachometer voltage 309 and a second tachometer voltage 310. The tachometer voltages 309, 310 show a voltage signal progression as a target 305, 307 moves past its respective sensor 304, 306. Multiple, equally spaced targets 305, 307 on the rotating drive shaft 301 create repetitions of the voltage waveforms 309, 310, which can be used to determine the mast's rotational speed. As the rotating target 305 approach the sensor 304, the voltage rises to a peak positive voltage and then drops to a peak negative voltage as the target 305 moves away from the sensor 304. When the target 305 and sensor 304 are aligned, voltage waveform 309 is at zero crossing 309. The second tachometer voltage has similar zero crossings waveform 310. Typically, there is an angular offset between sensor targets 305, 307 on either end of the drive shaft 301. As a result, even when there is no torque on drive shaft 301, there is a phase shift (or a time offset) between reference points on the sensor waveforms 309, 310 as illustrated at zero crossings 311, 312. As a load is applied to drive shaft 301, torque causes drive shaft 301 to twist and, therefore, a delay is created in the second voltage waveform 310. The amount of delay can be measured by determining the change in the zero crossings from time 312 to time 313. When the drive shaft 301 is under torque, it will twist over the length of the shaft, such that features/targets at the aft sensor (tachometer) will pass the fixed sensor position later than they would if the shaft not been under torque. The phase shift 314 between the first end and the second with no torque increases to phase shift 315 when torque is applied.

Figure 3B:
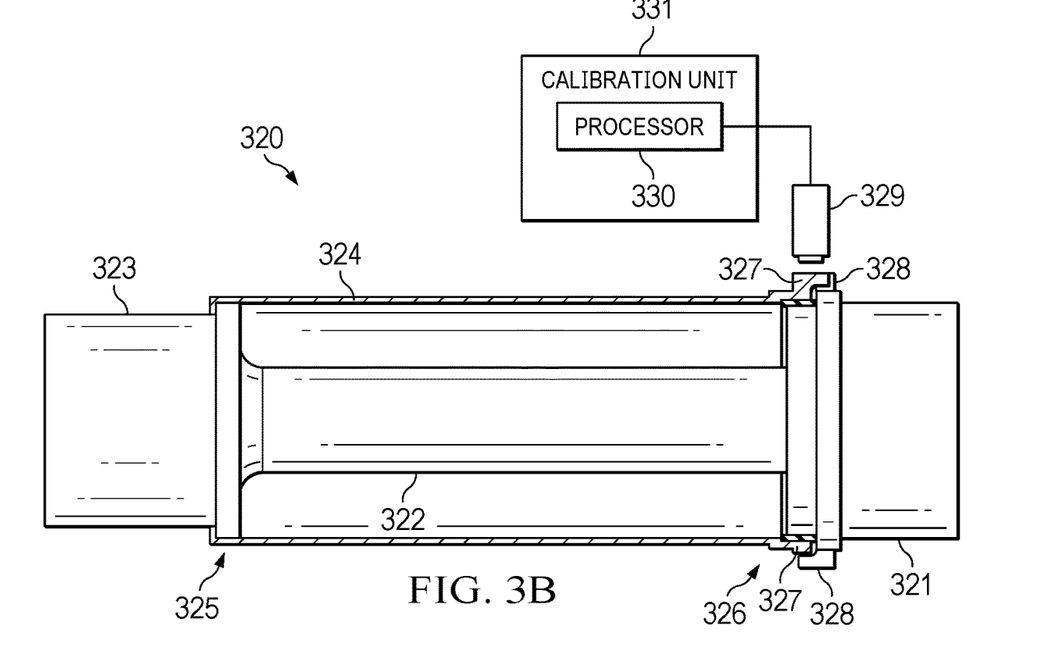
Figure 3C:
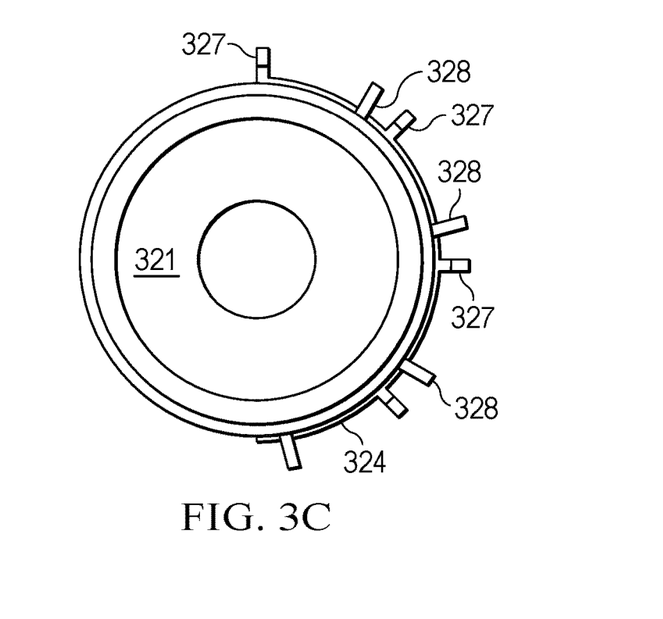

FIGS. 3B and 3C illustrate an alternative system for measuring torque using an interlaced teeth torque meter 320. An output shaft 321, such as from an engine, is coupled to drive shaft 322, which transfers power through rotation to an input 323, such as a main rotor gearbox input. A witness tube 324 is fixedly attached to the gearbox end 325 of drive shaft 322. Witness tube 324 rotates with, and at the same speed as, gearbox input pinion 323. Witness tube 324 also has a free end 326 near engine output shaft 321. Free end 326 is not attached to engine output shaft 321 and, therefore, drive shaft 322 rotates freely within witness tube 324 at end 326. One or more teeth 327 are formed on the free end 326 of witness tube 324. A corresponding number of teeth 328 are formed on engine output shaft 321. Teeth 328 are spaced so that they are at a set angular displacement from teeth 327 when the engine is at rest or under no torque load.

The position of teeth 327 and 328 may be measured using a monopole or variable reluctance sensor 329. Monopole 329 generates a magnetic field. Teeth 327 and 328 are a ferromagnetic material. When one of the teeth 327 or 328 moves close to monopole 329, the magnetic flux of the monopole 329 changes, which creates a voltage signal or pulse that can be fed to a processor 330 of calibration unit 331, or other circuitry. The voltage signal can be analyzed or processed to measure the how fast the pulses are occurring, which corresponds to the rotational speed or angular velocity of engine output shaft 321, drive shaft 322, and gearbox input pinion 323. The voltage signal can be analyzed or processed to measure the time between the pulses, which corresponds to the angular displacement (i.e., gap) between teeth 327 and 328. As the angular displacement between teeth 327 and 328 is reduced, the time between pulses is also reduced. This change in angular displacement indicates that drive shaft 322 is twisting so that witness tube 324 (and gearbox input pinion 323) is moving angularly relative to engine output shaft 321. The gap between teeth 327 and 328 may be calibrated to torque in drive shaft 322. This would allow processor 330 to determine the gap between teeth at any time and then create an output indicating the current torque load on drive shaft 322. This torque measurement may be displayed on an instrument panel, for example.

Torsional measurements are essential in many rotorcraft applications. Torque measurement is accomplished on rotating shafts by determining the amount of twist in the shaft and relating that to the shaft's torsional stiffness. Assuming that the torsional stiffness of a shaft can be measured or estimated in a static environment, then only the twist angle of the shaft needs to be measured to determine the current torque. The twist angle may be determined using the phase-based measurements illustrated in FIGS. 3A-C. A current phase shift 314 or 315 across the shaft can then be correlated to a degree of twist and, therefore, to a torque.

Since the twist of the shaft is typically small, such as on the order of a few degrees, and since precise angular tolerancing of the sensor targets would be costly and impractical to achieve, known methods calibrate for phase shift through direct measurement of the drive shaft during a reference condition where torque is known to be zero or when the torque load is completely removed. Typically, this has been achieved in rotorcraft by removing rotor blades and hub components and then free spinning the shaft under an unloaded condition.

Figure 4:
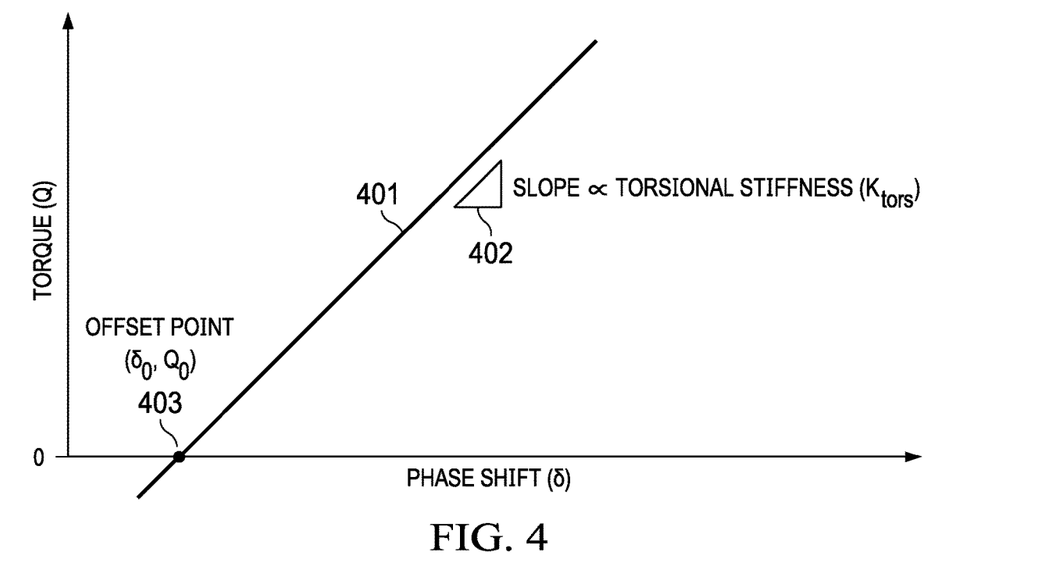
FIG. 4 illustrates an example calibration curve using an offset point at zero torque.

An example calibration curve is shown in FIG. 4. Phase shift is measure in terms of time or delay, which can be used to calculate torque. Since drive shafts are operated in their elastic range, Hooke's Law states that the relationship between load and deflection is linear. Therefore, only two items are needed to construct the calibration curve 401—a slope 402 and a point 403. The slope of the calibration line is proportional to the torsional stiffness of the shaft at a given speed. Since the phase shift ($\delta 0$) is non-zero at zero torque, the offset point 403 is defined in the existing methods by rotating the drive shaft in an unload condition (i.e., with rotor and hub components removed). Accordingly, a user needs only the torsional stiffness (ktors) and the no-torque phase shift ($\delta 0$) to create calibration curve 401. The prior art approach is effective but presents several problems. First, portions of the system must be disassembled and removed to ensure that a zero-torque condition is created. This involves additional time and cost. Additionally, in the case of measuring tail rotor torque, turning a main rotor without having a tail rotor available may lead to a safety hazard since the tail rotor counteracts torque that may be generated from the main rotor. Without a tail rotor, the aircraft may start to rotate in the opposite direction of the main rotor rotation.

To calibrate a torque measurement system, both a slope and an offset are required. The slope is the torsional stiffness (ktors) of the drive shaft, which is typically determined during manufacture. However, since such a torque measurement system only works when the drive shaft is turning, the offset calibration (i.e., phase shift) must be determined while the shaft is rotating.

Figure 5:
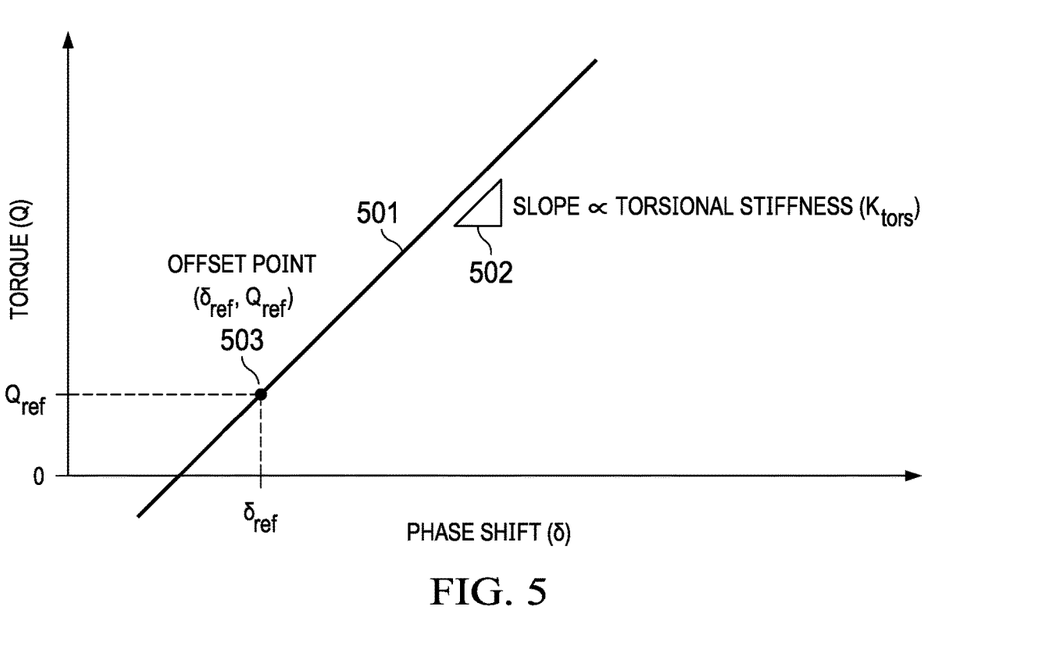
FIG. 5 illustrates an example calibration curve using an offset point at a non-zero torque.

Embodiments of the systems and methods for calibrating torque measurements as disclosed herein improve on prior methods by replacing the zero-torque condition with a condition that has a known, non-zero torque. As illustrated in FIG. 5, an offset point 503 corresponding to a non-zero reference torque (Qref) replaces the zero-torque condition used in prior methods. To determine the offset calibration values of Qref and $\delta$ref, which are then applied to the calculation of torque, the following steps are used: (1) a reference operating condition in which the shaft rotates is defined, (2) the torque at this reference condition is estimated based on aerodynamic knowledge of the rotors that are coupled to the shaft, (3) the shaft is then operated in the reference condition, (4) sensor data is captured to determine the phase difference at the operating condition, and (5) the phase difference and estimated torque are associated and used as a calibration value to enable calculation of torque in a torque measurement system.

The first step (i.e., defining a reference operating condition in which the shaft is rotating) involves finding a point at which the speed and torque are relatively constant. A low-torque condition may be used for most applications; however, other conditions may also be applied, such as a rotorcraft hover configuration at a known gross weight. The rotor RPM may be 100% or a slower speed, such as a single-engine idle RPM, may be used.

Figure 6:
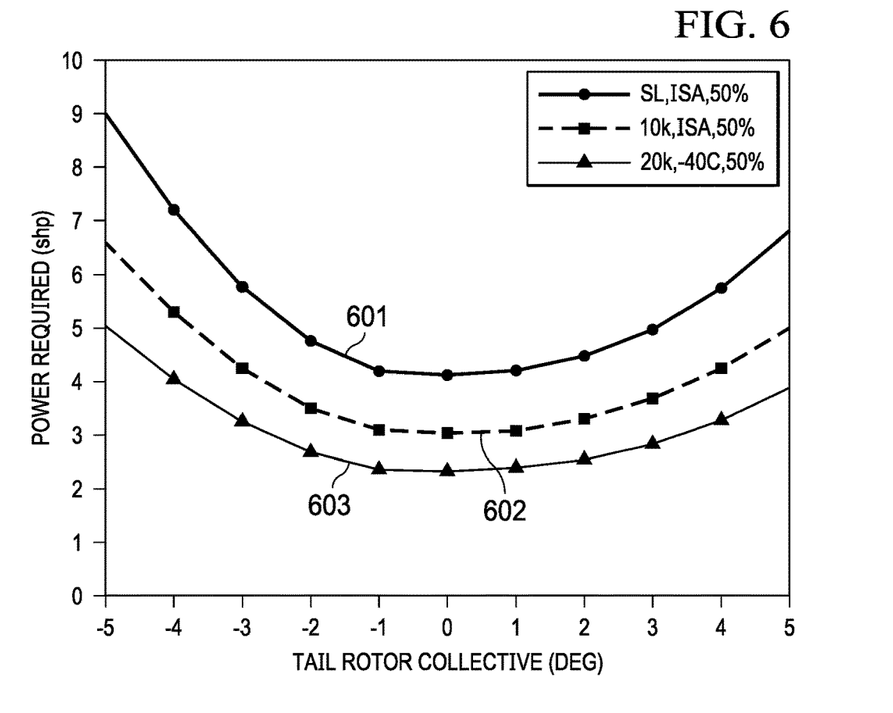
FIG. 6 illustrates example aerodynamic models showing rotor power as a function of rotor collective position for different atmospheric conditions.

In the second step, known aircraft parameters are used to estimate the torque at the reference condition. To overcome the uncertainty of determining torque in the reference operating condition, a model of the torque requirement from the rotors in the given operating conditions is established. This model may be empirical (i.e., derived from measurements on an aircraft with an independently calibrated sensor) or analytical (e.g., calculated from an aerodynamic model). FIG. 6 illustrates example aerodynamic models 601-603 showing rotor power as a function of rotor collective position for different atmospheric conditions. The operating conditions may be, for example, single engine ground idle at approximately 50% rotational speed. In other embodiments, any other appropriate operating conditions may be used. As illustrated, the torque at this operating condition is a function of atmospheric conditions as well as rotor collective pitch angle.

Figure 7:
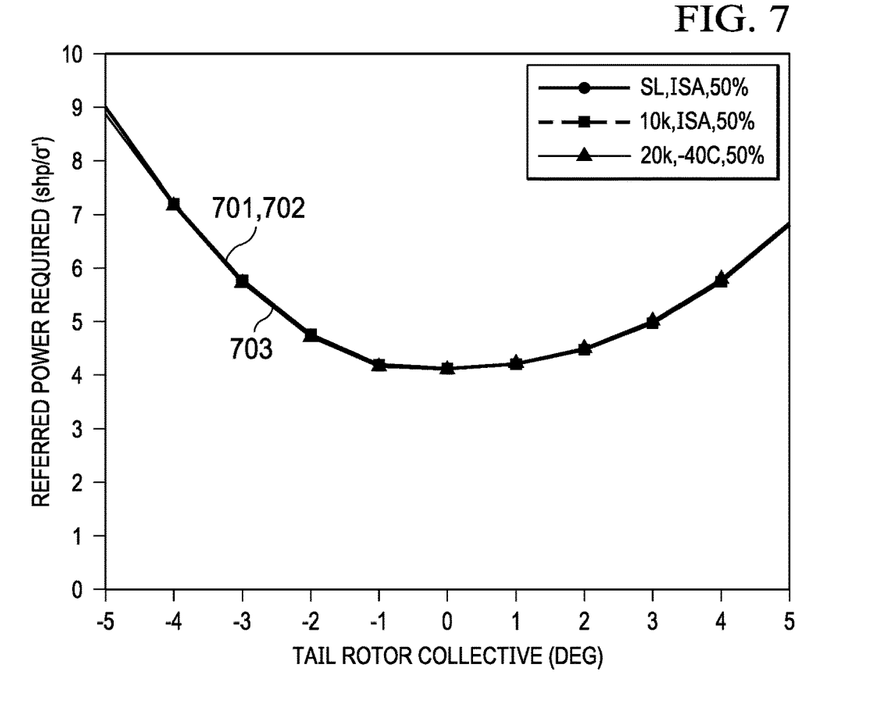
FIG. 7 illustrates example aerodynamic models showing rotor power as a function of rotor collective position using normalized atmospheric conditions.

In other embodiments, the atmospheric conditions may be normalized by presenting the relationship in terms of referred power (shp/$\sigma'$) as shown in FIG. 7. This allows the effects of atmospheric conditions to be built into the aerodynamic model. Aerodynamic models 701-703 illustrate referred rotor power as a function of rotor collective position for different atmospheric conditions.

Figure 8:
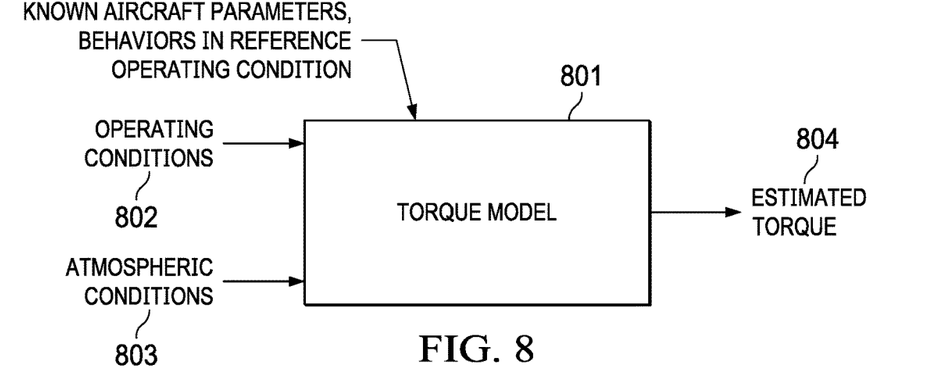
FIG. 8 illustrates a simplified view of a torque model according to an example embodiment.

A simplified view of the torque model 801 is shown in FIG. 8. This model may be used to generate the estimated torque (Qref) value for the offset point. Inputs to the torque model 801 include operating conditions 802, such as rotational speed and rotor pitch, and atmospheric conditions 803, such as air temperature and pressure. These inputs are applied to known aircraft parameters and behaviors in the reference operating condition. The output of the model 801 is an estimated torque 804.

In the third step, the drive shaft is operated in the reference condition. With the torque model established, this step generates the offset point for use in calculating torque. The pilot or maintenance personnel must be given sufficient information to ensure that the operating condition is met during this step. This may be done using standard or dedicated displays in the cockpit. For example, to meet a specific tail rotor pitch condition (or to ensure operation over a range of conditions), this may involve providing cues for various flight control positions.

Figure 9:
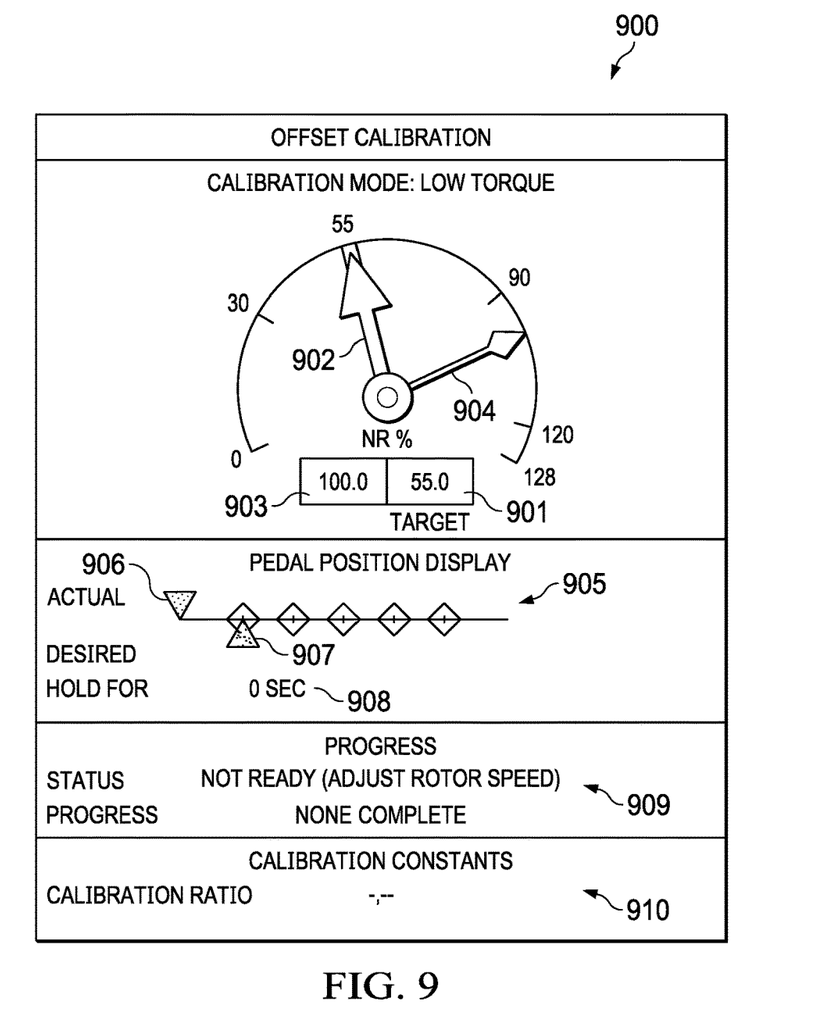
FIG. 9 illustrates an example cockpit display for use in operating a tail rotor drive shaft in a reference condition for calibration measurements.
Figure 10A:
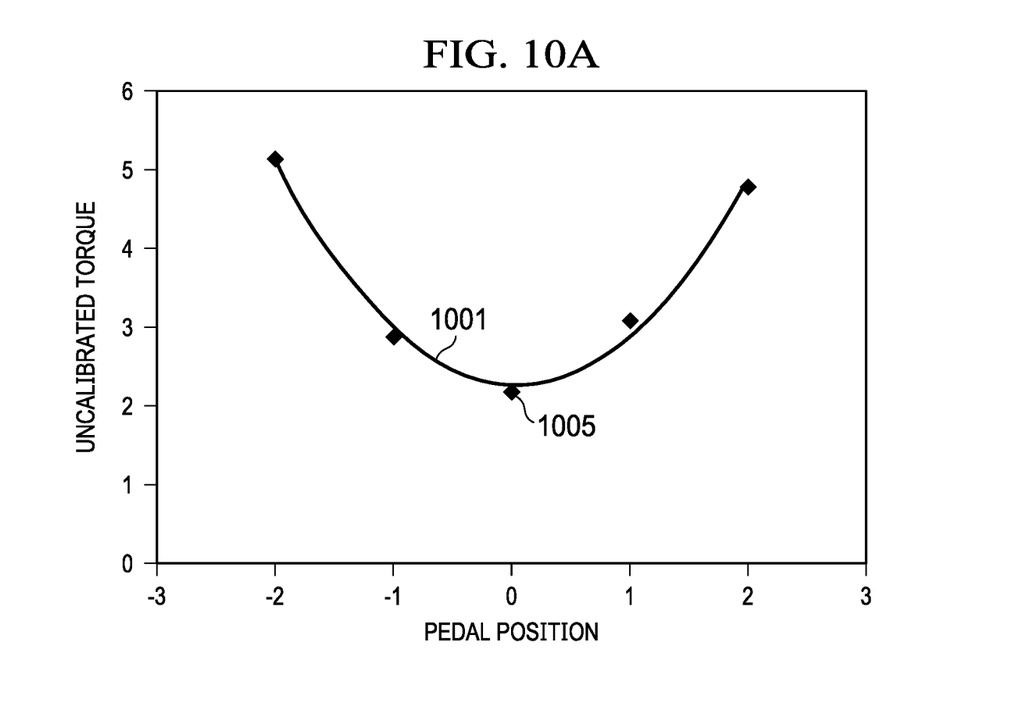
FIGS. 10A-D illustrate different scenarios for a relationship between torque and control positions used for calibration testing.
Figure 10B:
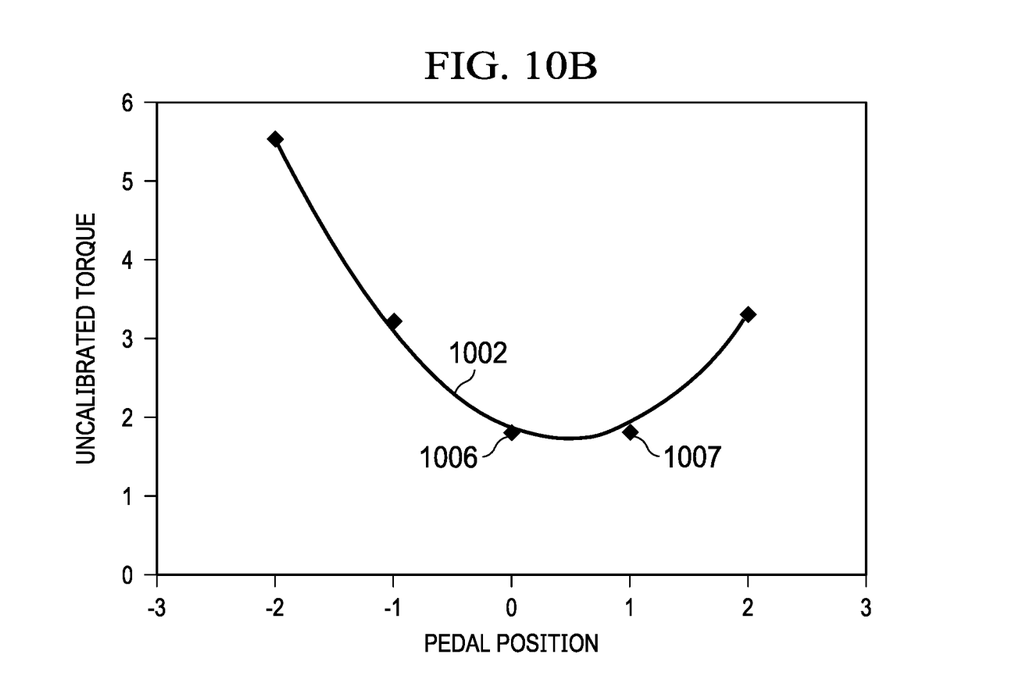
Figure 10C:
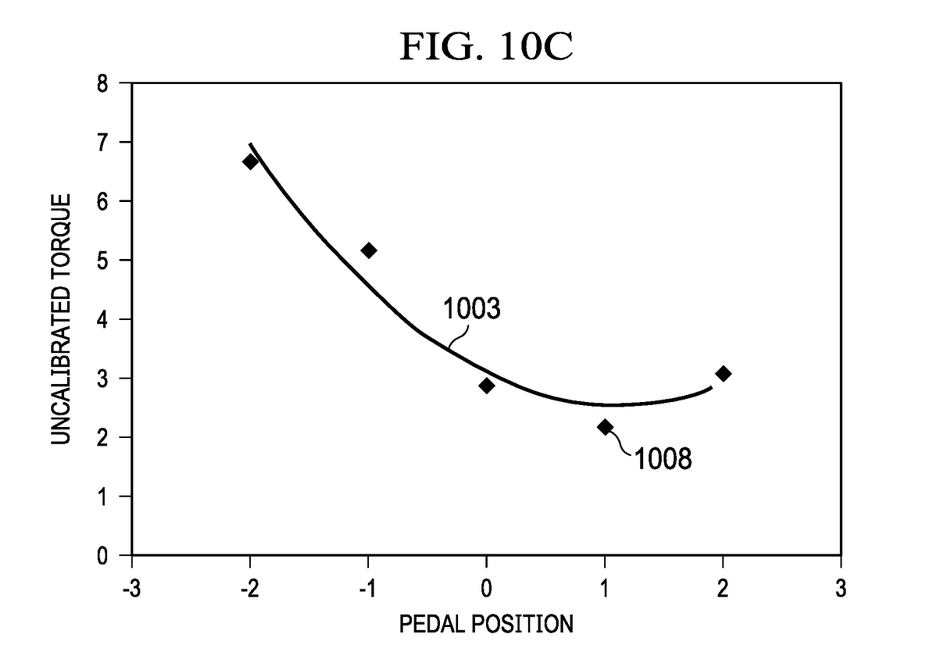
Figure 10D:
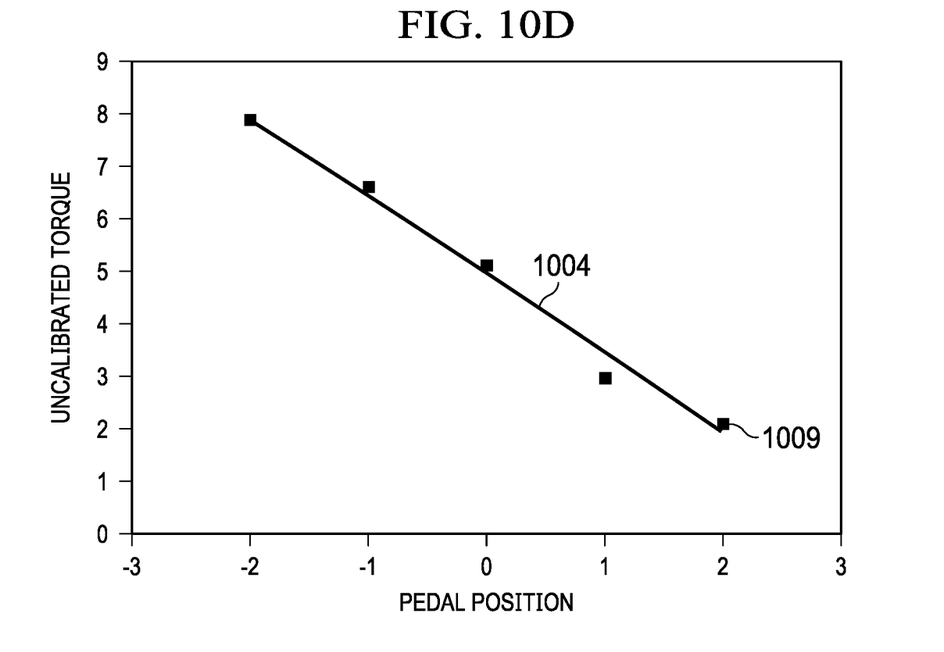

FIG. 9 illustrates an example display 900 for use in operating a tail rotor drive shaft in a reference condition for calibration measurements. Display 900 indicates a target rotational speed (NR) for the main rotor in both digital 901 and analog 902 formats. The current main rotor rotational speed is also shown in both digital 903 and analog 904 formats. The pilot or maintenance personnel adjust the engine operating parameters to meet the target rotational speed using display 900. For example, the pilot adjusts the operating parameters to align the current speed arrow 904 with the target speed arrow 903 and then the calibration procedure can proceed. The middle portion of display 900 shows five desired control positions 905 that are required to complete a sweep through a range in which minimum torque should exist. An actual position arrow 906 shows the current control position, and a desired position 907 shows the configuration that is required for the next step in the calibration process. A pedal position display is shown in the illustrated embodiment, which is useful for calibrating a tail rotor drive shaft. It will be understood that in other embodiments different control positions may be displayed for calibration of other drive shafts. For example, a cyclic position display may be used for calibrating a main rotor drive shaft or a proprotor tilt angle display may be used for calibrating a rotor on a tilt rotor aircraft.

Referring to FIG. 9, five target positions are shown; however, it will be understood that in other embodiments, any number of target control positions may be used for calibration. Once the pilot has aligned the actual control position with the desired control position, the corresponding diamond 905 may flash to show data acquisition and to prompt the pilot to hold that position. Additionally, a counter 908 or other prompt may indicate how long the control position should be held. After calibration at each desired control position is complete, the desired position indicator 907 moves to the next target 905 in turn until all points are complete. Progress and status information 909 may be displayed as well as calibration values 910 when the process is complete.

In some cases, the rotor pitch may not be precisely known. For example, in most aircraft the control position or the actuator position may be measured; however, the precise relationship between those inputs and the rotor blades' pitch may be subject to installation variations, such as a particular rigging. In the case where a minimum pitch, which corresponds to minimum torque, is desired, the calibration step may involve sweeping through a range of control positions such as illustrated in FIG. 9. In the case of gathering five points of data, the point with the lowest phase shift may be assumed to be the minimum torque point. Alternatively, a curve fit may be used across the five points to more precisely determine the minimum torque. FIGS. 10A-D illustrate different scenarios that may be observed for the relationship between torque and the five control positions used for calibration testing. Curves 1001-1004 fit the five measured data points for different scenarios. For the examples illustrated in FIGS. 10A-C, the lowest measured values 1004-1008 approximate the minimum torque value for the aircraft across a range of pedal positions. These values can be used to determine the offset point for the calibration curve. In the example shown in FIG. 10D, the minimum value is at one of the end points 1009, which may be flagged as a potential error since the true minimum torque may be outside of the range of control positions used for calibration.

In step four of the calibration process, sensor data is captured to determine the phase difference at the operational condition. The data must be captured to determine the actual phase shift (δref) and to calculate the torque (Qref). Since there may be slight variations in operational conditions during data acquisition, it is desirable to gather data over a period of time, such as a few seconds, to determine an average values of all inputs. Therefore, the value of ref is the average of the offset values measured during the acquisition. Additionally, Qref may be the average of the calculated torque based on the torque model, or it may be calculated based on the average of the inputs to the model.

In the final step, the phase difference is associated with an estimated torque and that information is input to the torque measurement system as a calibration value to enable calculation of torque. Referring to FIG. 5, the offset point 503 is determined by identifying the lowest torque value (Qref) across a range of control inputs, such as a range of pedal inputs, which corresponds to a value with the lowest phase shift (δref) measured across the drive shaft.

Calibration may be affected by the installation and rigging of a drive shaft and/or any attachments to the drive shaft. Therefore, calibration may be repeated after each maintenance event that affects the drive shaft or related components.

Since the torsional stiffness of the drive shaft may be influenced by the temperature of the drive shaft, the calibration system may also measure temperature near the drive shaft (or use an outside air temperature) and use temperature as a factor in the calibration determination as well as the calculation of torque.

In other embodiments, machine learning may be used as a regression means to calculate an expected torque based on instrumented and calibrated aircraft, such as in a flight test program. The numerical torque model may be compared to the measured torque as described herein. If the difference between the numerical torque and the measured torque exceeds a threshold in a certain condition, the operator may be prompted to perform a new calibration.

In an example embodiment, a method for calibrating a torque measurement system for a drive shaft comprises defining a reference condition in which the drive shaft is rotating, estimating a drive shaft reference torque at the reference condition, operating the drive shaft at the reference condition, capturing sensor data to determine a reference phase shift across the drive shaft at the reference condition, and using the reference torque and the reference phase shift as a pair of calibration values for the torque measurement system. The reference torque may be estimated based upon an aerodynamic model of the drive shaft coupled to a rotor system. The aerodynamic model may define a power required versus blade pitch for the rotor system. The aerodynamic model may be normalized for atmospheric conditions.

The drive shaft may be a component of an aircraft, and the reference condition may comprise a rotor system coupled to the drive shaft in a ready-for-flight operating configuration.

The drive shaft may be coupled to a rotor system, where the rotor system is controlled using flight controls. The flight controls may comprise one or more of a cyclic, a collective, a pedal, and a throttle. The method may further comprise establishing the reference condition by setting a predetermined flight control position.

The method may further comprise providing a cockpit display to assist in setting the predetermined flight control position.

The drive shaft may be coupled to a rotor system, wherein the rotor system is controlled using flight controls. The method may further comprise capturing sample phase shift values at a plurality of flight control positions, identifying a lowest sample phase shift value, and using the lowest sample phase shift value as the reference phase shift.

The drive shaft may be coupled to a rotor system, wherein the rotor system is controlled using flight controls. The method may further comprise capturing sample phase shift values at a plurality of flight control positions, applying a curve-fit algorithm to the sample phase shift values to create a phase-shift curve, identifying a lowest value on the phase-shift curve, and using the lowest value as the reference phase shift.

In a further embodiment, a torque measurement system for a drive shaft of an aircraft comprises a drive shaft having a first end and a second end, wherein the drive shaft coupled to a rotor system, and the rotor system is controlled using flight controls. One or more sensors are configured to detect rotational positions of the first end and the second end of the drive shaft. A calibration unit is interfaced with the one or more sensors and configured to perform a calibration procedure. The calibration unit may comprise a processor and a memory coupled to the processor. The memory has program instructions stored thereon that, upon execution by the processor, cause the torque measurement system to measure a phase shift between the first end and the second end based upon the rotational positions. The phase shift corresponds to a degree of twist along the drive shaft. The program instructions further cause the torque measurement system to determine a reference phase shift at a reference operating condition corresponding to a reference torque, and then apply the reference torque and the reference phase shift as a pair of calibration values for the torque measurement system.

The reference operating condition may be established using a predetermined flight control position, wherein the flight controls comprise one or more of a cyclic, a collective, a pedal, and a throttle. The program instructions may further cause the torque measurement system to provide a cockpit display to assist in setting the predetermined flight control position.

The program instructions may further cause the torque measurement system to capture sample phase shift values at a plurality of flight control positions, identify a lowest sample phase shift value, and use the lowest sample phase shift value as the reference phase shift.

The program instructions may further cause the torque measurement system to capture sample phase shift values at a plurality of flight control positions, apply a curve-fit algorithm to the sample phase shift values to create a phase-shift curve, identify a lowest value on the phase-shift curve, and use the lowest value as the reference phase shift.

In another embodiment, a display for use in calibrating an aircraft torque measurement system comprises a first section comprising drive shaft rotation speed information. The first section indicates a current drive shaft rotation speed and a target drive shaft rotation speed. The display comprises a second section comprising flight control information. The second section displays a plurality of flight control positions, wherein each position corresponds to a different calibration operating condition. The second section may further comprise a first indicator identifying a current flight control configuration and a second indicator identifying a desired flight control configuration. The display may further comprise a timer section indicating a period of time during which a flight control configuration should be maintained during a calibration procedure. The flight control positions may comprise positions of one or more of a cyclic, a collective, a pedal, and a throttle. The display may further comprise a calibration values section indicating one or more calibration values determined during a calibration procedure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for calibrating a torque measurement system for a drive shaft coupled to a rotor system, comprising:
    defining a reference condition in which the drive shaft is rotating;
    estimating a drive shaft reference torque at the reference condition, based, at least in part, upon an aerodynamic model of the drive shaft;
    operating the drive shaft at the reference condition;
    capturing sensor data to determine a reference phase shift across the drive shaft at the reference condition; and
    using the reference torque and the reference phase shift as a pair of calibration values for the torque measurement system.

2. The method of claim 1, wherein the aerodynamic model defines power required versus blade pitch for the rotor system.

3. The method of claim 1, wherein the aerodynamic model is normalized for atmospheric conditions.

4. The method of claim 1, wherein the drive shaft is a component of an aircraft, and wherein the reference condition comprises a rotor system coupled to the drive shaft in a ready-for-flight operating configuration.

5. The method of claim 1, wherein the drive shaft is coupled to a rotor system, and the rotor system is controlled using flight controls; and the method further comprises:
    establishing the reference condition by setting a predetermined flight control position.

6. The method of claim 5, wherein the flight controls comprise one or more of a cyclic, a collective, a pedal, and a throttle.

7. The method of claim 5, further comprising:
providing a cockpit display to assist in setting the predetermined flight control position.

8. The method of claim 1, wherein the drive shaft is coupled to a rotor system, and the rotor system is controlled using flight controls; and the method further comprises:
capturing sample phase shift values at a plurality of flight control positions;
identifying a lowest sample phase shift value; and
using the lowest sample phase shift value as the reference phase shift.

9. The method of claim 1, wherein the drive shaft is coupled to a rotor system, and the rotor system is controlled using flight controls and the method further comprises:
capturing sample phase shift values at a plurality of flight control positions;
applying a curve-fit algorithm to the sample phase shift values to create a phase-shift curve;
identifying a lowest value on the phase-shift curve; and
using the lowest value as the reference phase shift.

10. A torque measurement system for a drive shaft of an aircraft, the drive shaft having a first end and a second end, the drive shaft coupled to a rotor system, wherein the rotor system is controlled using flight controls, the torque measurement system comprising:
one or more sensors configured to detect rotational positions of the first end and the second end of the drive shaft;
a calibration unit interfaced with the one or more sensors and configured to perform a calibration procedure thereon, the calibration unit comprising:
a processor; and
a memory coupled to the processor, the memory having program instructions stored thereon that, upon execution by the processor, cause the torque measurement system to:
measure a phase shift between the first end and the second end based upon the rotational positions, wherein the phase shift corresponds to a degree of twist along the drive shaft;
determine a reference phase shift at a reference operating condition established using a predetermined flight control position and corresponding to a reference torque; and
apply the reference torque and the reference phase shift as a pair of calibration values for the torque measurement system.

11. The torque measurement system of claim 10, wherein the flight controls comprise one or more of a cyclic, a collective, a pedal, and a throttle.

12. The torque measurement system of claim 10, wherein the program instructions further cause the torque measurement system to:
provide a cockpit display to assist in setting the predetermined flight control position.

13. The torque measurement system of claim 10, wherein the program instructions further cause the torque measurement system to:
capture sample phase shift values at a plurality of flight control positions;
identify a lowest sample phase shift value; and
use the lowest sample phase shift value as the reference phase shift.

14. The torque measurement system of claim 10, wherein the program instructions further cause the torque measurement system to:
capture sample phase shift values at a plurality of flight control positions;
apply a curve-fit algorithm to the sample phase shift values to create a phase-shift curve;
identify a lowest value on the phase-shift curve; and
use the lowest value as the reference phase shift.

15. A display for use in calibrating an aircraft torque measurement system, comprising:
a first section comprising drive shaft rotation speed information, the first section indicating a current drive shaft rotation speed and a target drive shaft rotation speed;
a second section comprising flight control information, the second section displaying a plurality of flight control positions, wherein each position corresponds to a different calibration operating condition, the second section further comprising a first indicator identifying a current flight control configuration and a second indicator identifying a desired flight control configuration; and
a calibration values section indicating one or more calibration values determined during a calibration procedure, the calibration procedure comprising:
defining a reference condition in which the drive shaft is rotating, the reference condition established by setting of a predetermined flight control position;
estimating a drive shaft reference torque at the reference condition;
operating the drive shaft at the reference condition;
capturing sensor data to determine a reference phase shift across the drive shaft at the reference condition; and
using the reference torque and the reference phase shift as a pair of calibration values for the calibration procedure.

16. The display of claim 15, further comprising:
a timer section indicating a period of time during which a flight control configuration should be maintained during a calibration procedure.

17. The display of claim 15, wherein the flight control positions comprise positions of one or more of a cyclic, a collective, a pedal, and a throttle.

18. The torque measurement system of claim 10, wherein the program instructions further cause the torque measurement system to estimate the reference torque based, at least in part, upon an aerodynamic model of the drive shaft.

19. The display of claim 15, wherein the calibration procedure further comprises:
capturing sample phase shift values at a plurality of flight control positions;
applying a curve-fit algorithm to the sample phase shift values to create a phase-shift curve;
identifying a lowest value on the phase-shift curve; and
using the lowest value as the reference phase shift.

* * * * *